No. 665,083. Patented Jan. 1, 1901.
E. N. FRIEDMANN.
VALVE.
(Application filed Sept. 29, 1899.)
(No Model.)

WITNESSES:

INVENTOR
Edward N. Friedmann
BY
Henry D. Williams
ATTORNEY

UNITED STATES PATENT OFFICE.

EDWARD N. FRIEDMANN, OF NEW YORK, N. Y., ASSIGNOR TO THE DE LA VERGNE REFRIGERATING MACHINE COMPANY, OF SAME PLACE.

VALVE.

SPECIFICATION forming part of Letters Patent No. 665,083, dated January 1, 1901.

Application filed September 29, 1899. Serial No. 732,056. (No model.)

*To all whom it may concern:*

Be it known that I, EDWARD N. FRIEDMANN, a citizen of the United States, and a resident of the city of New York, borough of Manhattan, county of New York, and State of New York, have invented certain new and useful Improvements in Valves, of which the following is a specification, reference being had to the accompanying drawings, forming a part hereof.

My invention relates to valves, and is peculiarly applicable to valves for the control of ammonia in a refrigerating system. It is of course understood that my invention is not limited to such class of valves, as it may be applied to valves of many other descriptions.

My invention consists, primarily, in means whereby leakage around the valve-stem or operating means may be prevented at times independently of the usual packing arranged for this purpose. The object of this part of my invention is to permit repacking or readjustment of the old packing around the valve-stem while the valve is kept closed and to prevent leakage around the said stem during this operation. This is of vital importance in many of the uses of valves—such, for instance, as in the ammonia-distributing system of a refrigerating apparatus. In such apparatus the packing is acted upon more or less quickly by the ammonia and repacking is of frequent necessity. It is not feasible to open a valve wide to repack it, as such action would permit too large a quantity of ammonia to pass through the pipes and they would become overcharged, nor is it practicable to shut down the whole system for the purpose of repacking a valve. Hence I have devised a means whereby each individual valve in a system may be separately closed and repacked in a simple and effective manner.

My invention further consists in certain novel features of construction and combination of parts, to be hereinafter particularly described.

I will now proceed to describe in detail a valve embodying my invention and will then point out the novel features in the claims.

Figure 1:
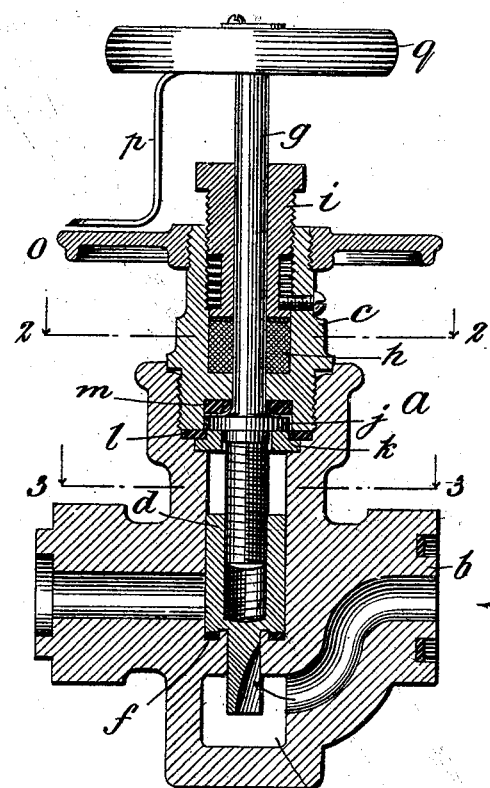
Figure 3:
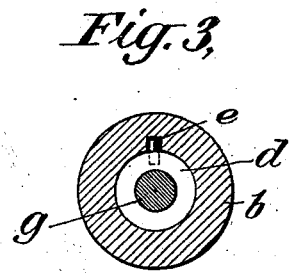
Figure 2:
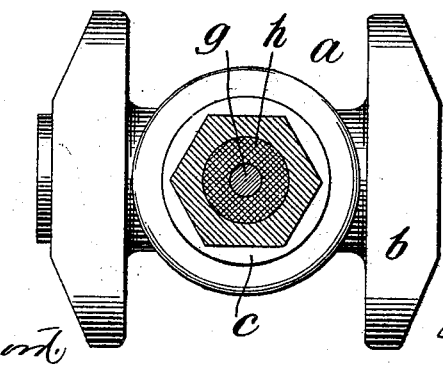

Figure 1 represents a central vertical section of a valve embodying my invention. Fig. 2 is a horizontal section of the same, the plane of section being on the line 2 2 of Fig. 1. Fig. 3 is a detail horizontal section on the plane of the line 3 3 of Fig. 1.

The valve casing or shell $a$ is shown as made in two parts, a lower portion or body $b$, in which the valve-plug is fitted, and an upper portion or bonnet $c$, in which the valve-stem is fitted and which carries the packing and gland of the stuffing-box. The two parts are secured together by a screw-threaded connection, as shown in the drawings. The valve-plug $d$ is non-rotative, being fitted to reciprocate only in a bore in the casing. I have shown the valve-plug and its bore of cylindrical form, the valve-plug being held against rotation by means of a pin $e$, secured to said valve-plug and adapted to slide in a longitudinally-arranged groove in the cylindrical bore of the valve-casing. (See Fig. 3.) The lower end of the valve-plug has a cylindrical extension with a tapered groove or cut, as is common in this type of valve, for the purpose of permitting the valve to be opened gradually and with initially an exceedingly small opening. This extension is fitted into a corresponding bore in the valve-seat. The valve-seat has an annular groove, in which is arranged a ring $f$ of packing material, such as soft metal, upon which the valve-plug is adapted to be seated. This ring of packing material is not exposed to the direct current of fluid flowing through the valve, being shielded and protected by an inner wall of hard metal extending to or above the upper surface of the packing-ring, and the end of the plug is recessed to receive and work clear of this protecting-wall. The fluid flows at such high velocity through the restricted opening of the lower cylindrical extension of the valve-plug that any packing material or soft metal at this point would be rapidly cut away; but according to my invention as above described a soft seat can be provided for the lower end of the valve-plug without this objectionable cutting action. This soft seat F permits the valve to be closed absolutely tight. The valve-plug is internally screw-threaded and arranged to receive the screw-threaded end of a valve-stem $g$. The stem $g$, as before stated, is mounted in the upper portion or bonnet $c$ of the valve-casing. This bonnet $c$ is suitably recessed and is arranged to receive a packing, as $h$, and a gland $i$ to adjust the said packing, the packing being arranged to prevent leakage from the interior of the valve-casing to the exterior thereof around the said valve-stem. The valve-stem $g$ is provided with a collar $j$, and a thrust washer or sleeve $k$ is arranged between the two parts of the casing and just below this collar $j$. A suitable packing-ring, as $l$, is also shown arranged between the upper and lower portion of the casing to insure a tight joint, and a ring of soft metal or packing material $m$ is set into a recess in the lower side of the upper portion $c$ of the casing just above the collar $j$.

When it is desired to open the valve, the stem $g$ is rotated in the proper direction and the valve-plug is drawn upwardly the required distance. During this operation the collar $j$ bears upon the thrust-washer $k$, which thus permits rotary movement of the stem, but prevents longitudinal movement thereof. To close the valve, the stem is rotated in the opposite direction and the valve-plug $d$ lowered upon its seat. After the valve has become seated a further rotation of the stem $g$ will give the stem $g$ an upward tendency, which will force the collar $j$ into intimate contact with the ring $m$. The collar $j$ and ring $m$ will then serve as a valve and seat, and leakage around the stem from the interior of the casing to the exterior thereof will be effectively prevented independently of the packing $h$.

The result of the above will be not only to augment the effectiveness of the packing $h$, but to permit the gland $i$ to be removed and a new packing substituted for the old or the old packing given such attention as may be neccessary, while the valve $d$ is held securely closed and leakage absolutely prevented around the valve-stem.

One of the advantages of my improved construction is that the threads in both the valve-plug and valve-stem are in wrought-iron or steel parts, and therefore fine threads may be used and a very delicate action attained in opening and closing the valve.

An advantageous feature of the construction shown is that a pocket $n$ is provided below the valve-seat in which any solid particles carried by the ammonia would settle.

I have shown a circular dial $o$ secured upon the valve-bonnet, and an index or pointer $p$ carried by the valve-stem $g$ or hand-wheel $q$ for indicating the desired points of adjustment.

It is evident that various modifications may be made in the construction above described within the purview of my invention.

What I claim, and desire to secure by Letters Patent, is—

1. The combination with a valve-casing and a valve-operating stem, of a non-rotative valve-plug adapted to be moved longitudinally by said stem, a seat for said plug arranged substantially at right angles to the direction of movement of said plug, with which such plug coöperates to close the passage through the valve-casing, a collar upon said stem, and a seat for said collar, with which such collar coöperates to close communication around said valve-stem from the interior of said casing to the exterior thereof, substantially as set forth.

2. The combination with a valve-casing, of a non-rotative valve-plug and means for moving the same longitudinally in said casing, said casing having a valve-opening located in proximity to one end of said valve-plug and an annular seat for said valve-plug, such seat surrounding said opening, and said casing having a protecting-wall between said seat and opening and rising to or above said seat, substantially as set forth.

3. The combination with a valve-casing and a valve-operating stem, of a valve-plug adapted to be moved longitudinally by said stem and having an extension with a tapered groove therein, said casing having a valve-opening located in proximity to one end of said valve-plug and an annular seat for said valve-plug, such seat surrounding said opening, and said casing having a protecting-wall between said seat and opening, substantially as set forth.

4. The combination with a valve-casing comprising a body and bonnet tightly secured together, of a rotatable valve-operating stem having a collar thereon, a valve-plug adapted to be moved longitudinally by said stem, a thrust-washer held between adjacent parts of the casing body and bonnet at one side of said collar and a soft packing at the other side of said collar, substantially as set forth.

5. The combination with a valve-casing comprising a body and bonnet tightly secured together, of the rotatable valve-operating stem $g$ having the collar $j$ thereon, the valve-plug $d$ having a screw-threaded connection with said stem and means for preventing the rotation of said plug, the thrust-washer $k$ held between adjacent parts of the casing body and bonnet at one side of said collar and the soft packing $l$ at the other side of said collar, substantially as set forth.

Signed at the city of New York, county of New York, State of New York, this 28th day of September, 1899.

EDWARD N. FRIEDMANN.

Witnesses:
HENRY D. WILLIAMS,
ALEX. CAMERON, Jr.